(12) United States Patent
Zenzai

(10) Patent No.: US 7,789,228 B2
(45) Date of Patent: Sep. 7, 2010

(54) WATERPROOF CASE FOR ELECTRONIC DEVICE

(75) Inventor: Mitsuru Zenzai, Kanagawa (JP)

(73) Assignee: Sony Corporation, Tokyo (JP)

( * ) Notice: Subject to any disclaimer, the term of this patent is extended or adjusted under 35 U.S.C. 154(b) by 166 days.

(21) Appl. No.: 12/144,102

(22) Filed: Jun. 23, 2008

(65) Prior Publication Data

US 2009/0032420 A1 Feb. 5, 2009

(30) Foreign Application Priority Data

Aug. 3, 2007 (JP) .............................. 2007-203100

(51) Int. Cl.
*G03B 17/08* (2006.01)
*B65D 85/38* (2006.01)

(52) U.S. Cl. ..................... 206/316.2; 396/27

(58) Field of Classification Search ............. 206/316.2, 206/316.1, 701, 722, 576, 320; 396/25, 27, 396/29
See application file for complete search history.

(56) References Cited

U.S. PATENT DOCUMENTS 4,917,241 A * 4/1990 Hanson .................. 206/316.2

2005/0167304 A1* 8/2005 Shimamura .............. 206/316.2
2007/0110416 A1* 5/2007 Yamaguchi et al. ........... 396/27
2008/0017493 A1* 1/2008 Richardson et al. ......... 200/331

FOREIGN PATENT DOCUMENTS

| JP | 2001-351464 | 12/2001 |
| JP | 2002-287851 | 10/2002 |
| JP | 2004-151405 | 5/2004 |
| JP | 2007-052134 | 3/2007 |
| JP | 2007-65295 | 3/2007 |

\* cited by examiner

*Primary Examiner*—Jacob K Ackun, Jr.
(74) *Attorney, Agent, or Firm*—Oblon, Spivak, McClelland, Maier & Neustadt, L.L.P.

(57) ABSTRACT

A waterproof case is provided for an electronic device having a touch panel display. The waterproof case includes an operating member for operating the touch panel display. The operating member includes: an operating portion which penetrates from the outer surface to inner surface of a wall forming the waterproof case in a watertight manner and which is disposed to be able to be pushed from the outer surface of the wall; an arm extending from a portion of the operating member, the portion being disposed inwardly from the wall, in the direction transverse to the direction in which the operating portion is pushed; and a contact portion which is provided to an end of the arm and is contacted with the touch panel display in response to the push of the operating portion.

17 Claims, 15 Drawing Sheets

WATERPROOF CASE FOR ELECTRONIC DEVICE

CROSS REFERENCES TO RELATED APPLICATIONS

The present invention contains subject matter related to Japanese Patent Application JP 2007-203100 filed in the Japanese Patent Office on Aug. 3, 2007, the entire contents of which being incorporated herein by reference.

BACKGROUND OF THE INVENTION

1. Field of the Invention

The present invention relates to a waterproof case for an electronic device, more particularly, a waterproof case for a compact electronic device such as a digital still camera.

2. Description of the Related Art

Multiple operating members are often provided to a waterproof case for an electronic device to operate operation switches of an electronic device accommodated in the case. Such operating members include push buttons provided in the external surface of the waterproof case, and contact portions which are provided to the inner surface of the waterproof case and which push the operation switches in response to a push of the push buttons. The electronic device accommodated in the waterproof case is operated by operating each operating member.

In recent years, when the electronic device is, for example, a digital still camera, the touch panel display of the camera is tend to be structured by applying a sheet-like transparent touch panel to the display surface of the image display panel of the camera. The touch panel display functions as operation switches to decrease the number of switches provided to the body of the camera. Accordingly, the body becomes compact, and the display surface of the touch panel display becomes large.

When such the digital still camera having the touch panel display accommodated in the above-disclosed waterproof case in the past is operated by the operating members in the past, multiple push buttons and a boss portion for supporting these push buttons are disposed in the profile of the touch panel display. It is difficult to view the contents, the icons, etc. displayed on the touch panel display. Particularly, even the contents displayed on the large size touch panel display surface are not visible disadvantageously.

Therefore, a technique for a housing mode has been proposed in which only the functions frequently used in underwater imaging are selected from the multiple switch functions of the touch panel display of a digital still camera, and assigned to the existing operation switches of the body of the camera. The switches of the body fundamentally have different functions from the underwater imaging functions (see JP-A-2007-65295). In this related technique, the digital still camera in the housing mode is accommodated in a waterproof case, and the operation switches of the camera are operated via the operation members of the waterproof case, so that the same operations as the touch panel operations are available.

As another related technique, a waterproof case includes a transparent input panel facing the touch panel display. The input panel includes elastic panel portions (pushing force transmitting portions) corresponding to icons of the touch panel display. By pushing the panel portion, the icon is able to be pushed (see JP-A-2002-287851).

SUMMARY OF THE INVENTION

However, in the former related technique, the switch functions of the touch panel display are forcibly assigned to the existing operation switches. Disadvantageously, this technique is not so useful.

In the latter related technique, the plane panel portion provided to the input panel is deformed elastically. Disadvantageously, the input panel has poor durability, and thus it is difficult to secure the durability of the waterproof case.

According to one embodiment of the present invention, there is provided a waterproof case for an electronic device, the case having an improved durability while securing the operability of the touch panel display.

According to an embodiment of the present invention, a waterproof case is provided for an electronic device having a touch panel display. The waterproof case includes an operating member for operating the touch panel display. The operating member includes: an operating portion which penetrates from the outer surface to inner surface of a wall forming the waterproof case in a watertight manner and which is disposed to be able to be pushed from the outer surface of the wall; an arm extending from a portion of the operating member, the portion being disposed inwardly from the wall, in the direction transverse to the direction in which the operating portion is pushed; and a contact portion which is provided to an end of the arm and is contacted with the touch panel display in response to the push of the operating portion.

According to an embodiment of the present invention, the operating member for operating the touch panel display includes the operating portion, the arm, and the contact portion. Multiple operating portions and a boss portion supporting the portions are able to be disposed outside the profile of the touch panel display. The operability of the touch panel display is secured, and the durability of the operating members is improved.

DETAILED DESCRIPTION OF PREFERRED EMBODIMENTS

First Embodiment

An embodiment in which an electronic device accommodated in a waterproof case for an electronic device (hereinafter called a waterproof case) is a digital still camera is explained below.

First, the digital still camera (electronic device) to be accommodated in a waterproof case 30 (FIG. 3) is explained.

Figure 1:
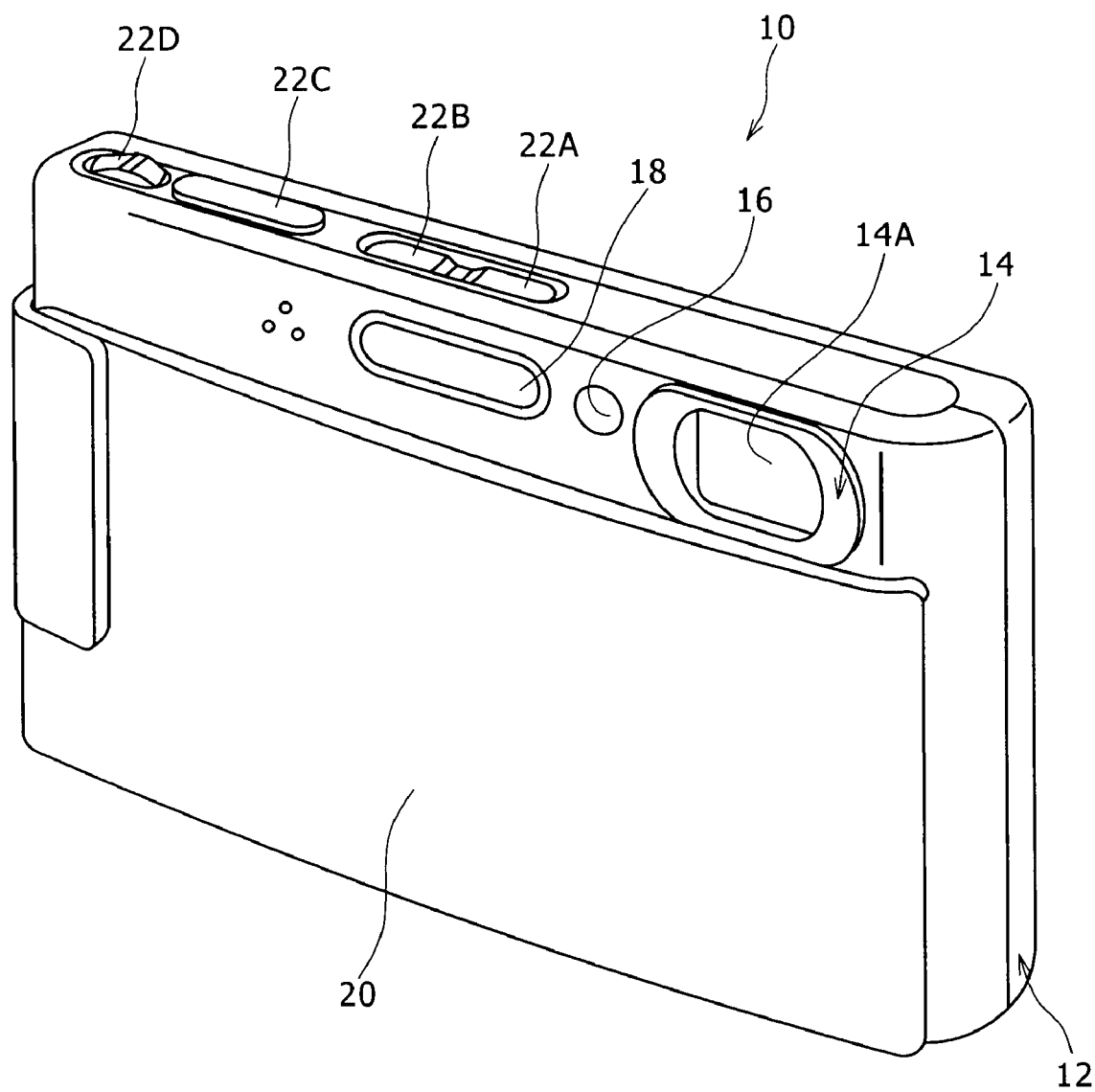
FIG. 1 is a perspective view of a digital still camera 10 viewed from the front.
Figure 2:
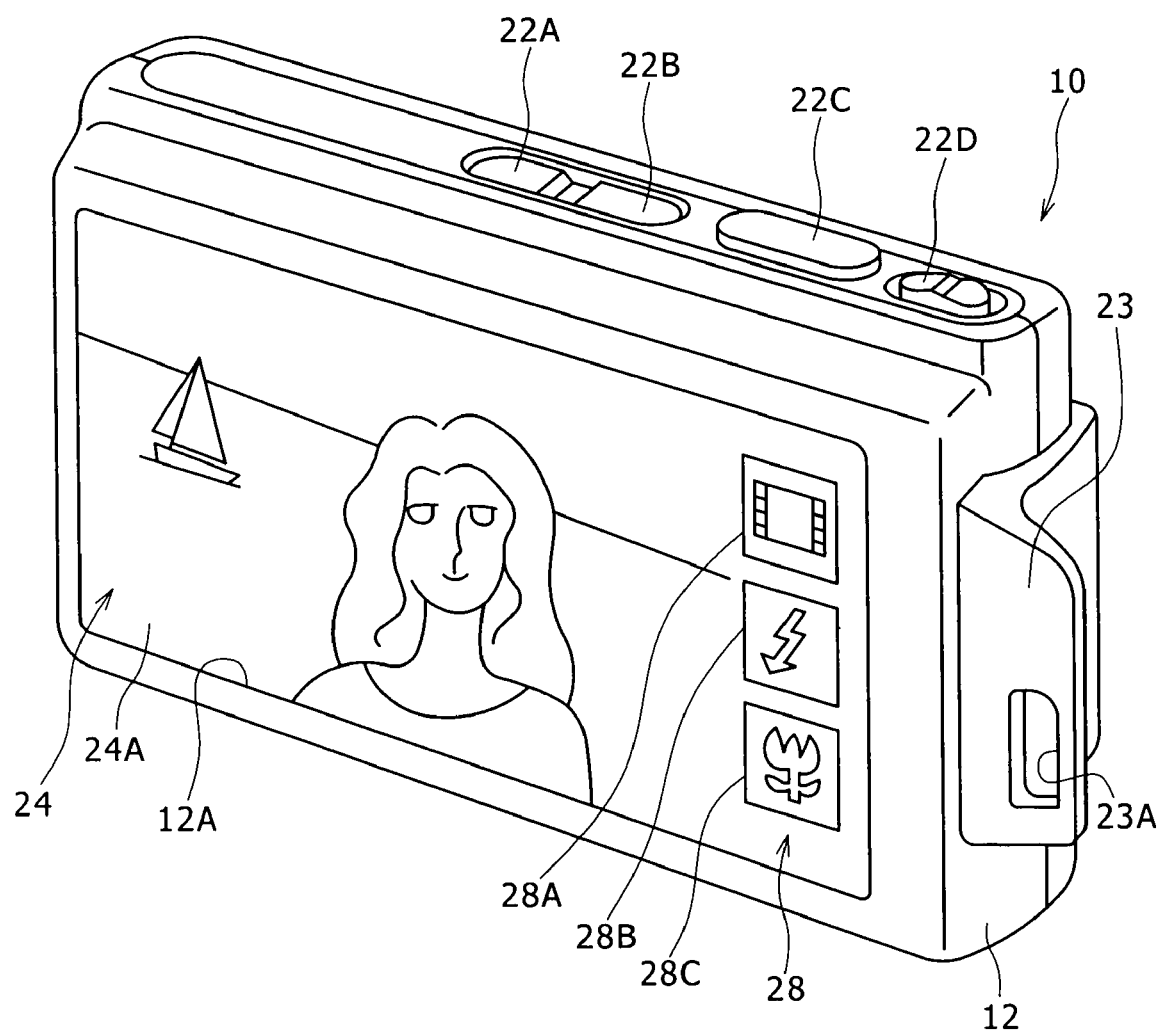
FIG. 2 is a perspective view of the digital still camera 10 viewed from the back.

FIG. 1 is a perspective view of a digital still camera 10 viewed from the front. FIG. 2 is a perspective view of the digital still camera 10 viewed from the back.

According to this embodiment, the digital still camera 10 to be accommodated in the waterproof case 30 has a body 12 forming the exterior. The right and left in this specification are the directions when the waterproof case 30 and the digital still camera are seen from the back, the front in this specification is the direction of the subject, and the back in this specification is the direction of the imaging element.

As shown in FIG. 1, a lens barrel 14 which accommodates and holds an imaging optical system 14A is formed to the front upper portion of the body 12. A light-emitting portion 16 for automatic focus and a flash portion 18 which emits a flash are formed to the side of the lens barrel 14. A barrier 20 which slides up and down to open and close the lens barrel 14 is formed under the lens barrel 14.

A power button 22A for turning ON and OFF the power source, a reproduction button 22B for reproducing and displaying captured images on a touch panel display 24 (described later), a shutter 22C for capturing images, and a zoom lever 22D for zooming are formed to the top surface of the body 12.

As shown in FIG. 2, a metal portion 23 having a hole 23A to which a strap etc. are attached is formed to the right side of the body 12.

An opening 12A which has a rectangular shape and which occupies most of the back surface of the body 12 is formed to the back surface of the body 12.

The touch panel display 24 having a rectangular plate shape is formed inside the opening 12A so that a display surface 24A of the touch panel display 24 faces the opening 12A.

As known, the touch panel display 24 is formed by laminating a transparent sheet-like touch panel on a display surface such as a liquid crystal display and an organic electroluminescence display. Icons 28 for operations are displayed on the display surface 24A.

The touch panel detects the pressure when a finger etc. touches the portions where the icons 28 are displayed. The following various operations and settings relating to imaging and reproduction of the digital still camera 10 are done using the touch panel.

According to this embodiment, as shown in FIG. 2, an imaging mode setting icon 28A, a flash mode setting icon 28B, and a macro mode setting icon 28C are displayed on the touch panel display 24 as the icons 28.

The imaging mode setting icon 28A, flash mode setting icon 28B, and macro mode setting icon 28C are arranged at intervals vertically at the right side of the display surface 24A.

The imaging mode setting icon 28A is used for setting whether to capture a moving image or a still image by use of the digital still camera 10.

Each time the rectangular shape area on the display surface 24A of the touch panel display 24, on which the imaging mode setting icon 28A is displayed, is touched by a finger, the modes for moving images and still images are switched alternately in the digital still camera 10.

The flash mode setting icon 28B is used for selectively setting the operation mode of the flash portion 18 to any one of an auto (automatic) mode, forced flash mode, slow synchronization mode, and flash off mode.

Each time the rectangular shape area on the display surface 24A of the touch panel display 24, on which the flash mode setting icon 28B is displayed, is touched by a finger, the auto (automatic) mode, forced flash mode, slow synchronization mode, and flash off mode are selected sequentially, and set.

The macro mode setting icon 28C is used for setting whether macro imaging or normal imaging is done by the digital still camera 10.

Each time the rectangular shape area on the display surface 24A of the touch panel display 24, on which the macro mode setting icon 28C is displayed, is touched by a finger, the modes for the macro imaging and normal imaging by the digital still camera 10 are switched alternately.

The icons 28 are not limited to the icons 28A, 28B, and 28C shown in FIG. 2, but includes, as the icons 28, various known icons for various settings of the digital still camera 10.

Next, the waterproof case 30 is explained.

Figure 3:
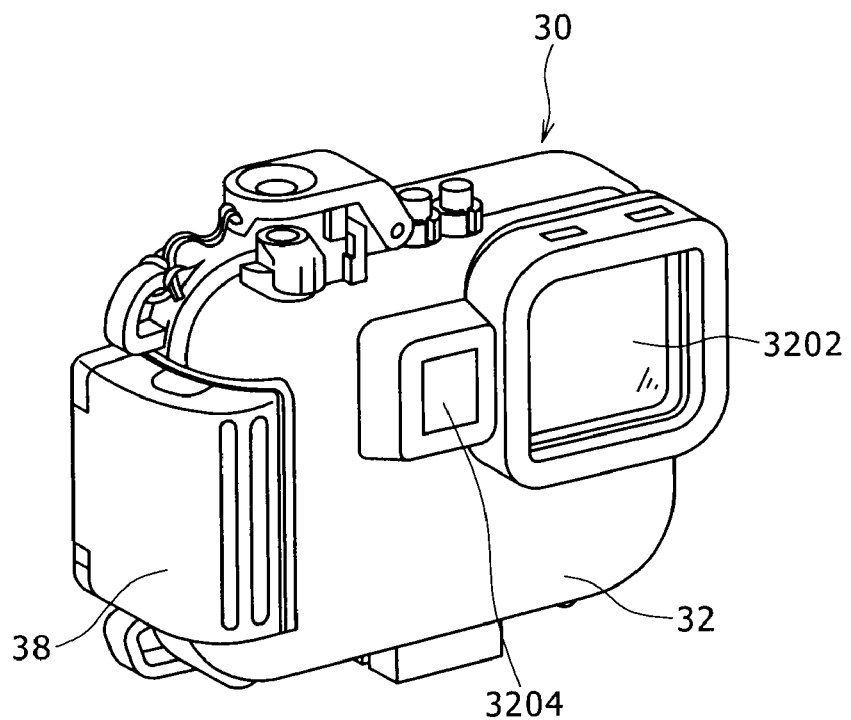
FIG. 3 is a perspective view of a waterproof case 30 viewed from the front.
Figure 4:
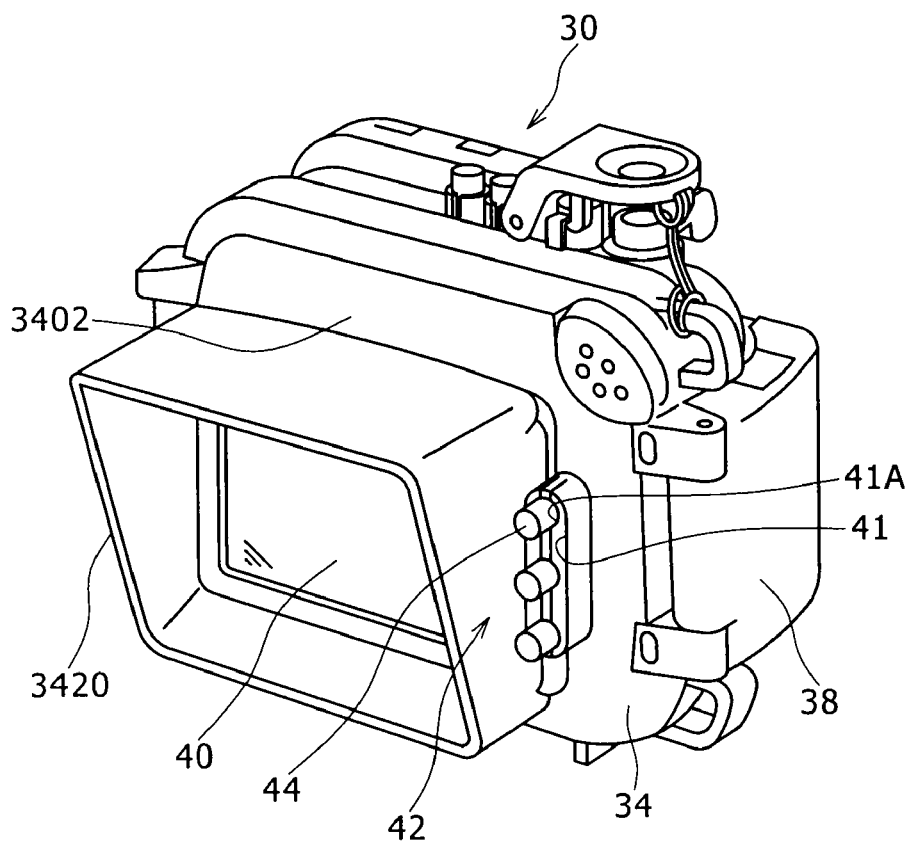
FIG. 4 is a perspective view of the waterproof case 30 viewed from the back.
Figure 5:
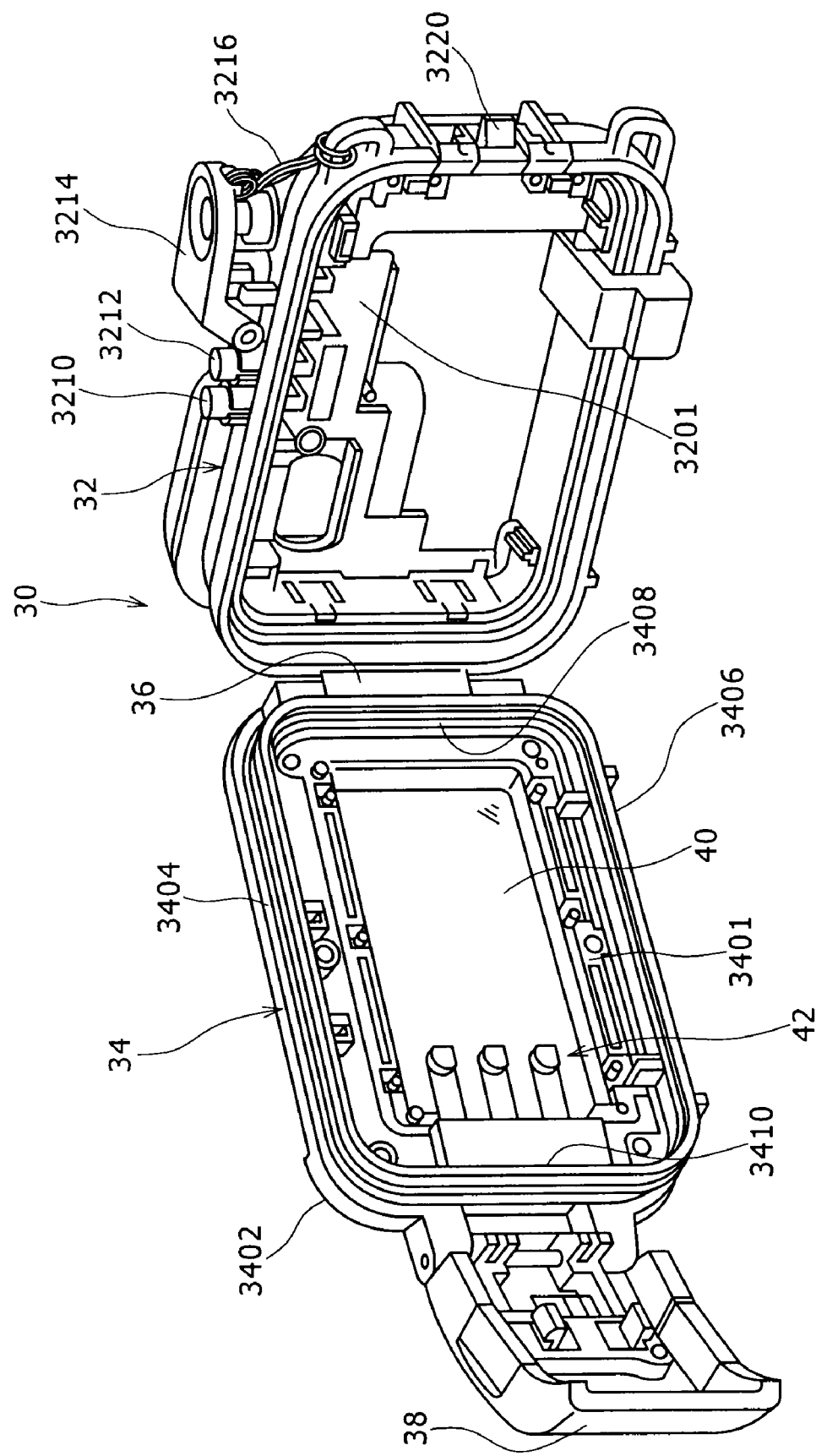
FIG. 5 is a perspective view of the waterproof case 30 in the opened state.

FIG. 3 is a perspective view of the waterproof case 30 viewed from the front. FIG. 4 is a perspective view of the waterproof case 30 viewed from the back. FIG. 5 is a perspective view of the waterproof case 30 in the opened state.

As shown in FIGS. 3 to 5, the waterproof case 30 includes two segments, a front case segment 32 and a back case segment 34, which are connected to each other to be free to swing.

As shown in FIG. 5, the left sides of the front case segment 32 and back case segment 34 are connected to be free to swing via a hinge 36. A buckle 38 detachably connected to the right side of the front case segment 32 is formed to the right side of the back case segment 34.

According to this embodiment, all the portions of the digital still camera 10 except the back surface of the camera 10 are accommodated in the front case segment 32. The back surface of the digital still camera 10 is covered with the back case segment 34 by fitting the back case segment 34 to the front case segment 32, so that the digital still camera 10 is accommodated in the waterproof case 30.

According to this embodiment, both the front case segment 32 and back case segment 34 are formed of a transparent synthetic resin.

The front case segment 32 is made of a synthetic resin, and has top and bottom walls, left and right walls, and a front wall respectively corresponding to the top and bottom surfaces, left and right side surfaces, and front surface of the body 12 of the digital still camera 10.

As shown in FIG. 3, a window portion 3202 having a rectangular shape is formed to the front wall of the front case segment 32 correspondingly to the imaging optical system 14A of the lens barrel 14 of the digital still camera 10.

A window portion 3204 is formed to the front wall portion located in front of the flash portion 18 so that the flashing light is irradiated from the flash portion 18 ahead.

As shown in FIG. 5, an operating member 3210 for operation of the power button 22A, an operating member 3212 for operation of the reproduction button 22B, an operating member 3214 for operation of the shutter 22C, and an operating member 3216 for operation of the zoom lever 22D are formed to the top wall of the front case segment 32.

A locking portion 3220 which locks the buckle 38 is formed to the right side wall of the front case segment 32.

As shown in FIG. 5, a cushioning material 3201 is made of, e.g., a rubber, which is attached to the portion facing the inner space of the front case segment 32, and which is elastically contacted with the front surface of the accommodated digital still camera 10.

As shown in FIG. 5, the back case segment 34 includes a back wall 3402 having a rectangular shape and facing the back surface of the digital still camera 10 accommodated in the front case segment 32, an upper wall 3404, lower wall 3406, left side wall 3408, and right side wall 3410 projecting slightly from the upper, lower, left, and right edges of the back wall 3402. The back case segment 34 is formed of a transparent synthetic resin.

The buckle 38 is formed to the right side of the back case segment 34.

A cushioning material 3401 shown in FIG. 5 includes a rubber, which is attached to the portion facing the inner space of the back case segment 34, and which is elastically contacted with the back surface of the accommodated digital still camera 10.

A sealant is provided to the combined portion of the front case segment 32 and the back case segment 34 so that the segments 32 and 34 are combined together in the watertight manner.

As shown in FIGS. 4 and 5, a touch panel display viewing window 40 having a rectangular shape and used for viewing the touch panel display 24 is formed to the back wall 3402.

The touch panel display viewing window 40 has a rectangle shape having right and left edges and upper and lower edges longer than the right and left edges.

A hood 3420 in FIG. 4 surrounds the touch panel display viewing window 40, and is provided detachably to the back wall 3402.

As shown in FIGS. 4 and 5, operating members 42 for operating the icons 28 of the touch panel display 24 are formed to the back wall 3402.

Figure 6:
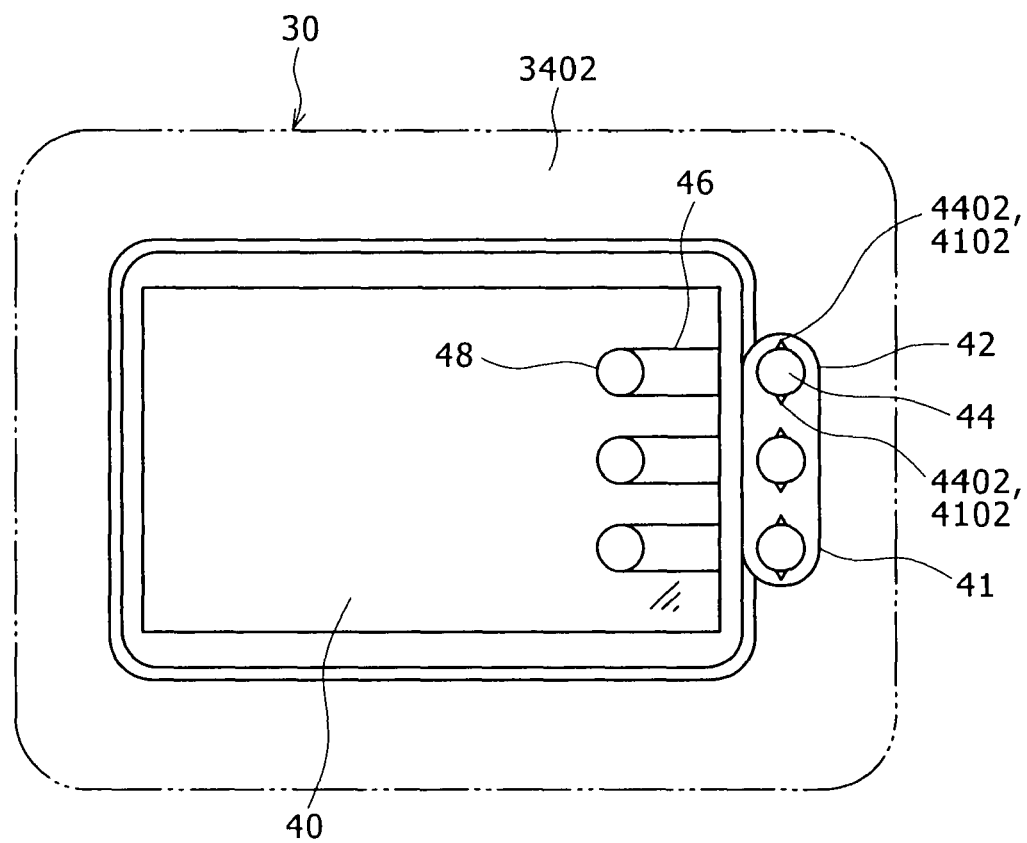
FIG. 6 is a back view of the waterproof case 30.
Figure 7:
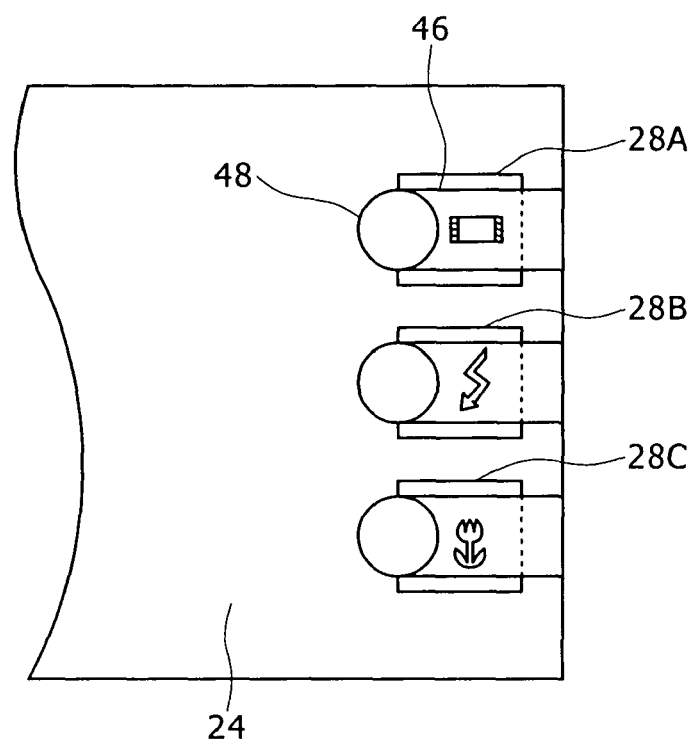
FIG. 7 is an explanatory view of operation of icons 28 by an operating member 42.
Figure 8:
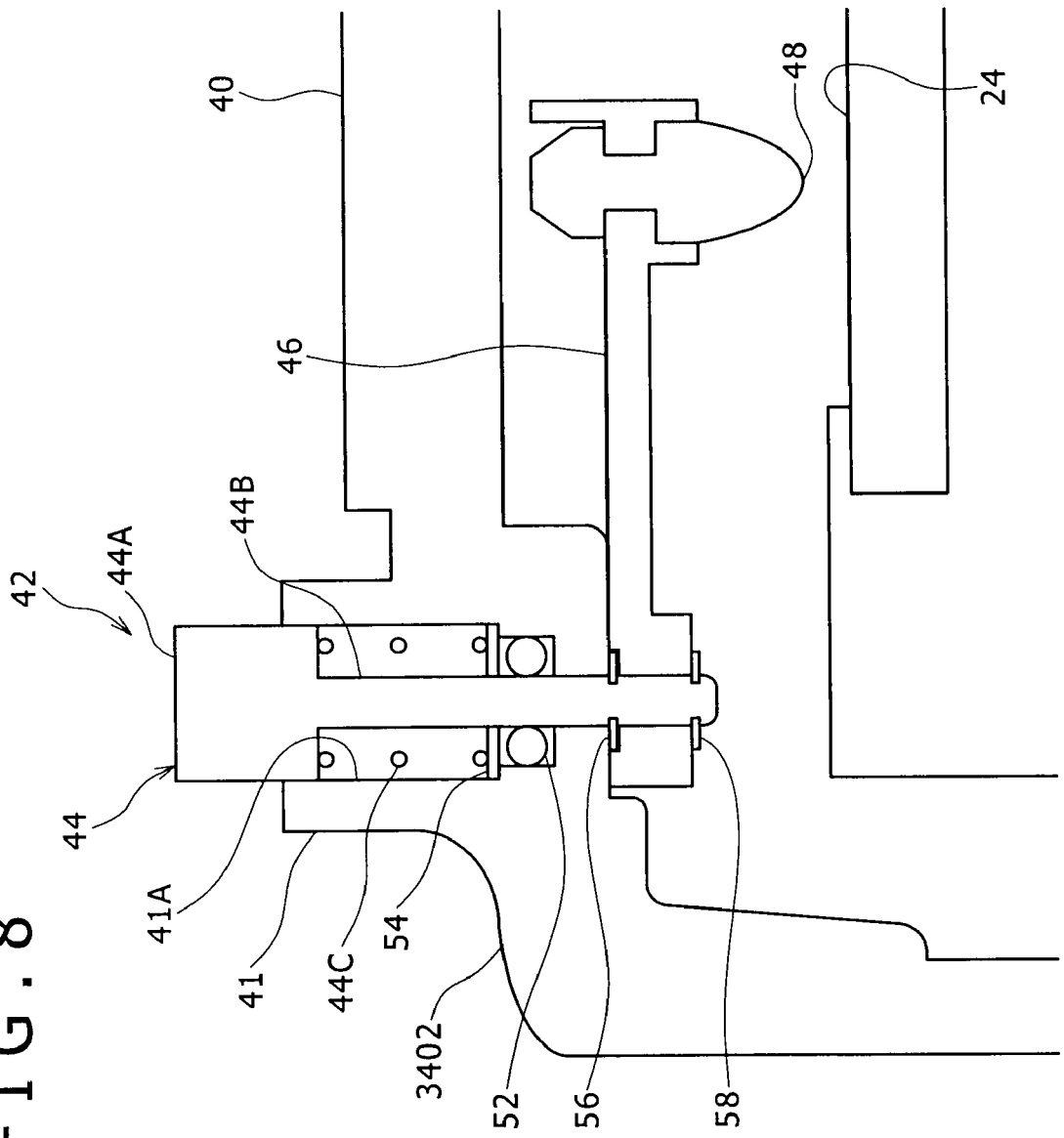
FIG. 8 is a sectional view showing the non-operating state of the operating member 42.
Figure 9:
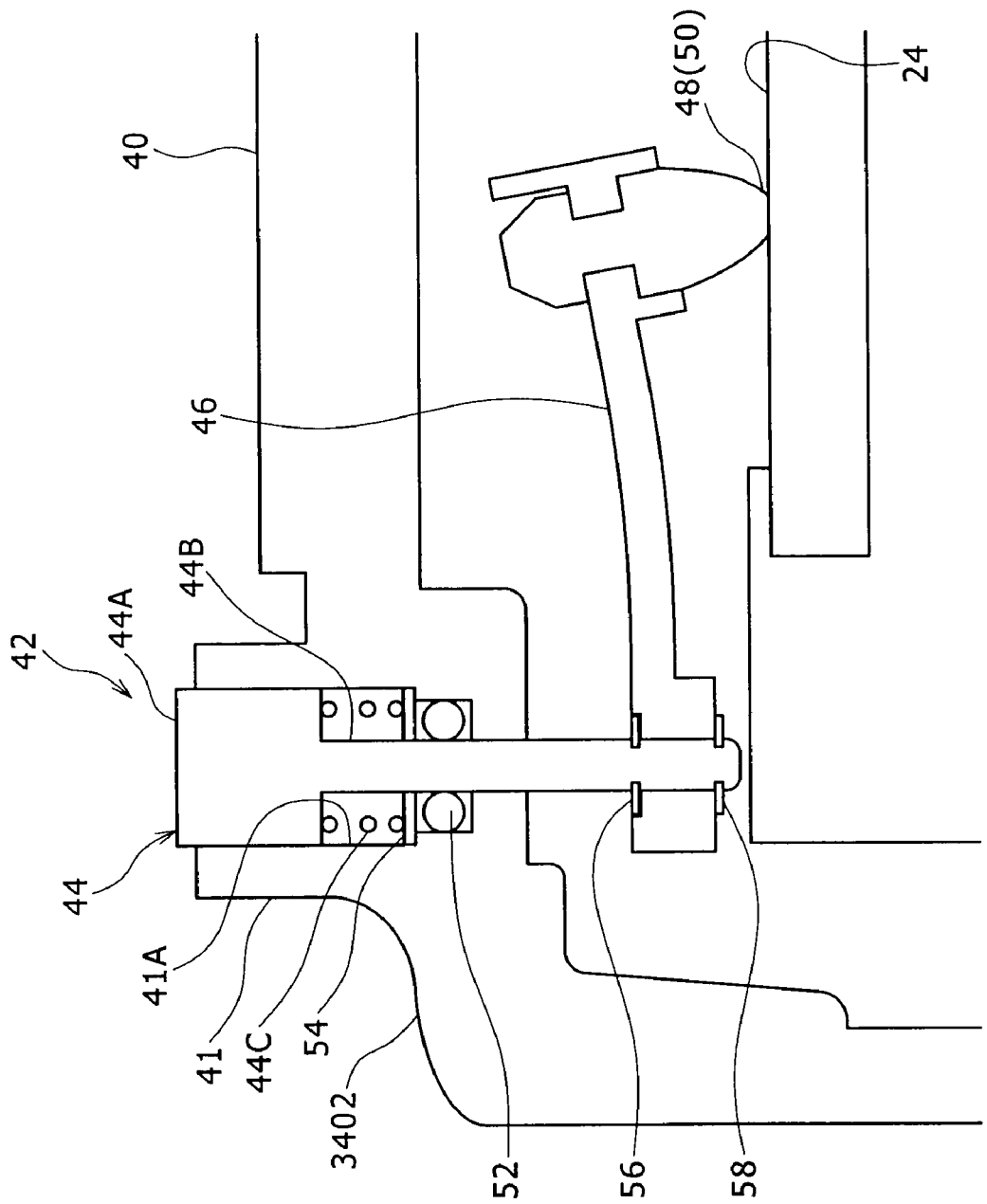
FIG. 9 is a sectional view showing the operating state of the operating member 42.
Figure 10:
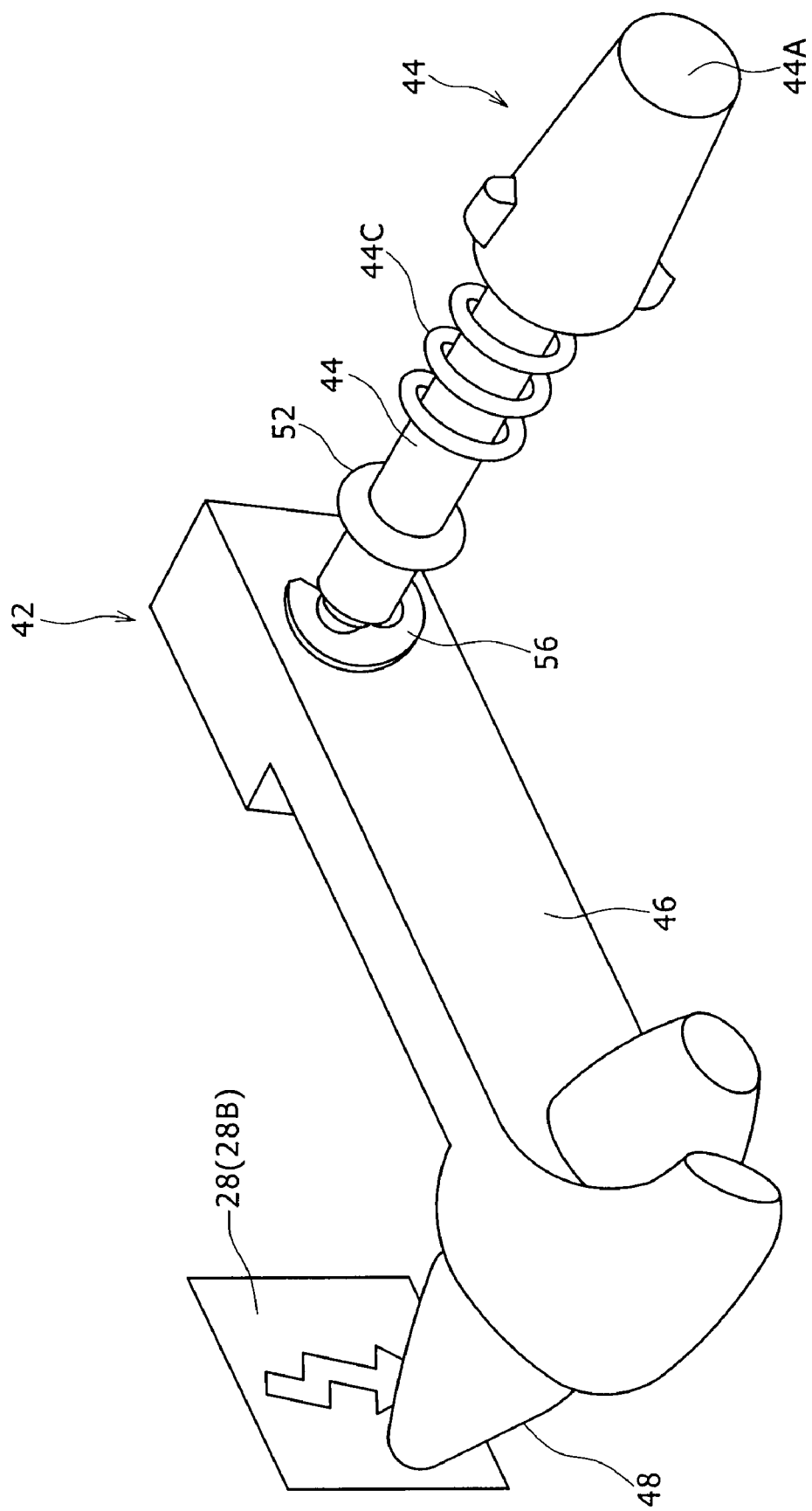
FIG. 10 is an explanatory view of the operating state of a touch panel display 24 by the operating member 42.
Figure 11:
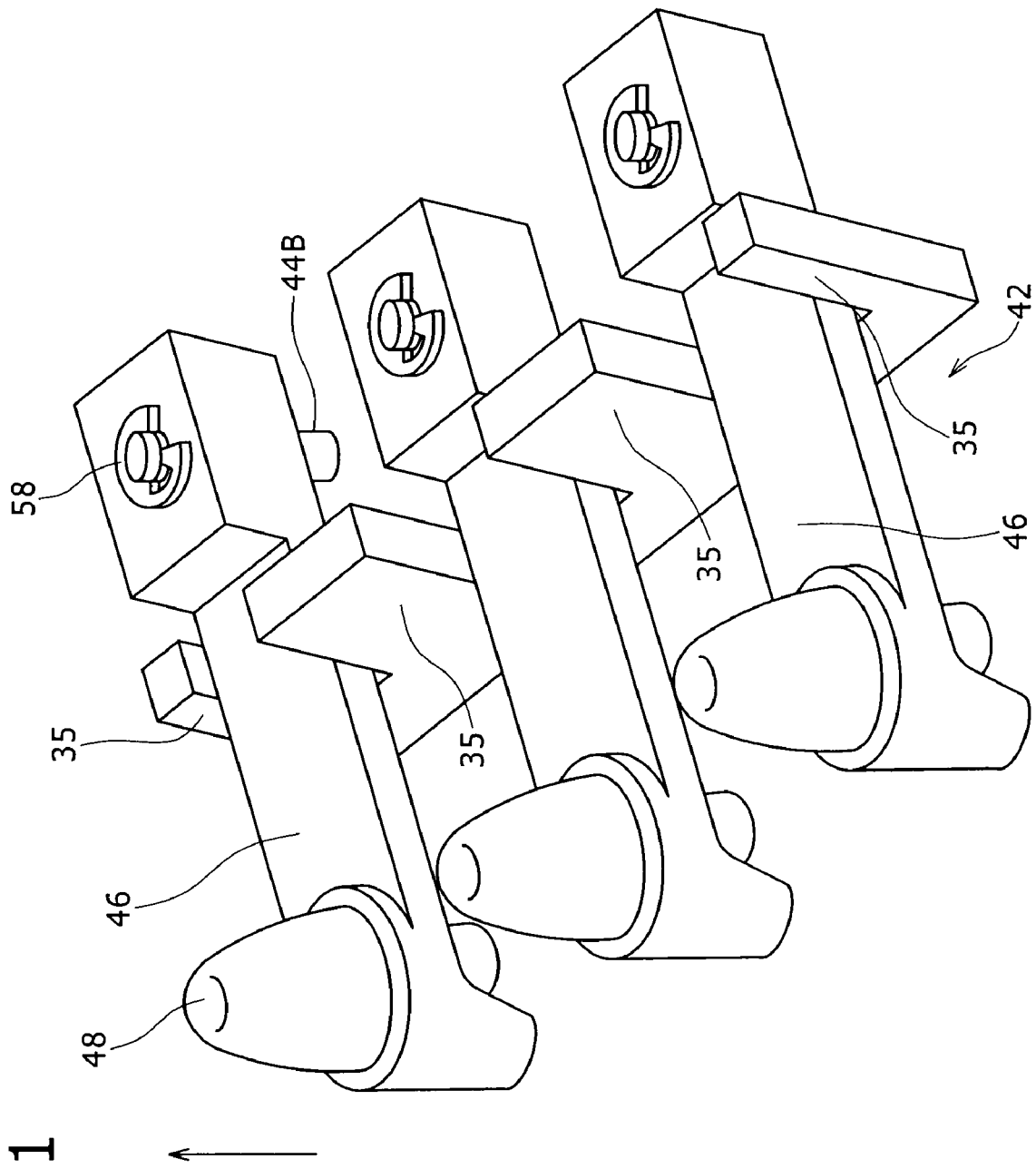
FIG. 11 is an explanatory view of the arrangement structure of the operating member 42.
Figure 12:
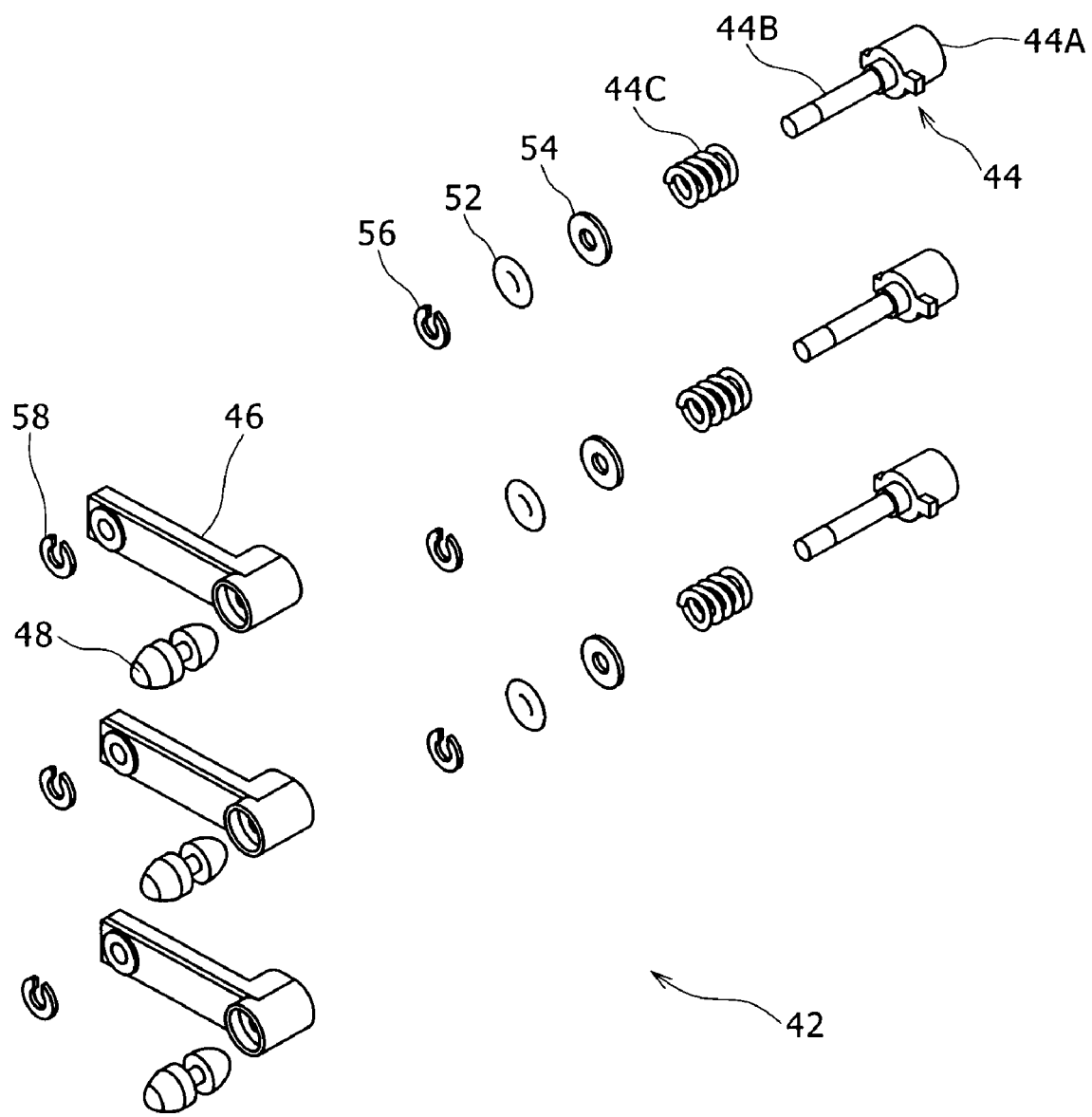
FIG. 12 is an exploded perspective view of the operating member 42.
Figure 13:
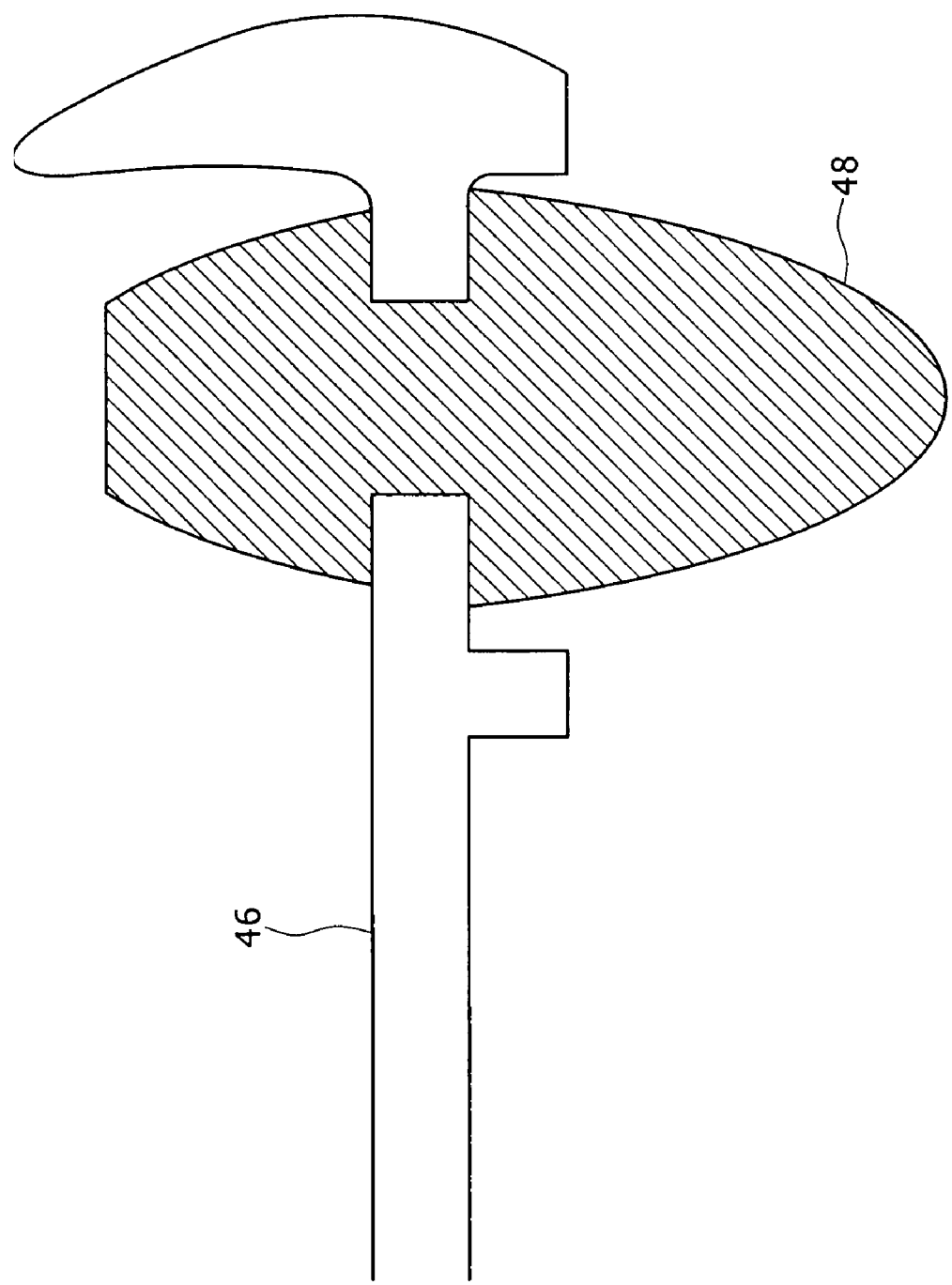
FIG. 13 is a sectional view showing the structure of an arm 46 and a contact portion 48.

FIG. 6 shows a back view of the waterproof case 30. FIG. 7 is an explanatory view of the operation of the icons 28 by the operating member 42. FIG. 8 is a sectional view showing the non-operating state of the operating member 42. FIG. 9 is a sectional view showing the operating state of the operating member 42. FIG. 10 is an explanatory view of the operating state of the touch panel display 24 by the operating member 42. FIG. 11 is an explanatory view of the arrangement structure of the operating member 42. FIG. 12 is an exploded perspective view of the operating member 42. FIG. 13 is a sectional view showing the structure of an arm 46 and contact portion 48.

As shown in FIGS. 8 and 10, each operating member 42 includes an operating portion 44, the arm 46, the contact portion 48, and a pressure regulating portion 50 (FIG. 9). As shown in FIG. 4, three operating members 42 are provided for operating the imaging mode setting icon 28A (FIG. 2), the flash mode setting icon 28B (FIG. 2), and the macro mode setting icon 28C (FIG. 2).

As shown in FIGS. 8 and 9, the operating portion 44 penetrates from the outer surface to inner surface of the back wall 3402 in the watertight manner, and is disposed to be able to be pushed from the outer surface of the back wall 3402. More particularly, the operating portion 44 includes: a push button 44A able to be pushed from the outer surface of the back wall 3402; a shaft 44B which projects from the push button 44A and penetrates the back wall 3402 in the watertight manner; and a spring 44C for the operating portion. The push button 44A is made of, for example, a synthetic resin, and the shaft 44B is made of a metal such as stainless steel.

According to this embodiment, as shown in FIGS. 4, 6, and 8, a bulged portion 41 which projects backward is formed outside the right side of the touch panel display viewing window 40. The bulged portion 41 extends up and down along the right side. Three cylindrical concaves 41A are formed to the bulged portion 41, and spaced at intervals vertically. The push button 44A is disposed to each concave 41A, and able to move in the thickness direction of the back wall 3402. That is, the operating portion 44 and bulged portion 41 are provided outside the touch panel display viewing window 40.

As shown in FIG. 10, the operating portion 44 has a cylindrical shape or frusto-conical shape, for example. Projections 4402 (FIG. 6) for baffle are formed to the portions of the operating portion 44, the portions being opposing to each other around. Rotation of the operating portion 44 is prevented because the projections 4402 engage with slots 4102 (FIG. 6) provided to the concave 41A.

As shown in FIG. 8, the shaft 44B penetrates the bottom wall of the concave 41A to the inner surface of the back wall 3402, and the arm 46 is attached to the end of the shaft 44B.

The spring 44C for the operating portion is wound around the shaft 44B within the concave 41A, and biases the operating portion 44 in the direction in which the operating portion 44 projects from the outer surface of the back wall 3402. The closer portion of the arm 46 to the shaft 44B abuts on the inner surface of the back wall 3402 to define a protruding position of the operating portion 44, in which position the operating portion 44 is able to be pushed.

A sealant 52 (O ring) in FIGS. 8, 9, and 12 is used for penetrating the shaft 44B through the back wall 3402 in the watertight manner. An O ring pressing plate 54 presses the O ring. E rings 56, 58 are used for attaching the arm 46 to the shaft 44B in the longitudinal direction of the shaft 44B so that the arm 46 is unable to move.

As shown in FIGS. 8 and 10, the arm 46 extends from an end of the shaft 44B, the end being a portion of the operating portion 44 and being disposed inwardly from the back wall 3402, in the direction transverse to the direction in which the operating portion 44 is pushed. As disclosed above, the operating portion 44 is formed to the back wall 3402 disposed outside the touch panel display viewing window 40. Each arm 46 extends from outside to inside the touch panel display viewing window 40 in the waterproof case 30.

The arm 46 is able to be elastically deformed in the direction in which the operating portion 44 is pushed.

Synthetic resins such as polycarbonate or metallic materials (spring material) such as phosphor bronze and stainless steel are employable as a material of the arm 46.

According to this embodiment, the arm 46 is formed of a transparent synthetic resin.

As shown in FIG. 6, each arm 46 extends in parallel with the upper and lower edges of the rectangle which forms the touch panel display viewing window 40, and in parallel with the inner surface of the wall which forms the touch panel display viewing window 40 when the operating portion 44 is at the protruding position as shown in FIG. 8.

As shown in FIG. 11, a wall 35 projects to sandwich each arm 46 at the inner surface portion of the back wall 3402 correspondingly to the bulged portion 41. The wall 35 prevents rotation of the arm 46 around the shaft 44B to improve the operability of each operating member 42. According to this embodiment, the rotation prevention mechanism is structured to prevent rotation of the arm 46 around the operating portion 44 by use of the wall 35.

As shown in FIGS. 9 and 10, the contact portion 48 is formed to the top of the arm 46, and is contacted with each of the icons 28 of the touch panel display 24 in response to the push of the operating portion 44 (is contacted with the touch panel portion corresponding to the icons 28).

The contact portion 48 is formed of an elastic material such as rubber and elastomer. As shown in FIG. 13, the contact portion 48 is inserted into a hole of the top of the arm 46. As shown in FIG. 8, the contact portion 48 projects from the top of the arm 46 toward the touch panel display 24.

According to this embodiment, the contact portion 48 is formed of transparent elastomer.

The top of the arm 46 and the contact portion 48 are separate from the inner surface of the wall forming the touch panel display viewing window 40 when the operating portion 44 is at the protruding position. Accordingly, the deformation over time of the arm 46 is prevented to secure the operability of each operating member 42.

The pressure regulating portion 50 regulates the upper limit of the pressure at which the contact portion 48 is contacted with the touch panel display 24 in response to the push of the operating portion 44.

According to this embodiment, the arm 46 is able to be deformed elastically in the direction in which the operating portion 44 is pushed. The contact portion 48 is formed of an elastic material. As shown in FIG. 9, the arm 46 is displaced toward the touch panel display 24 in response to the push of the operating portion 44. Each contact portion 48 is contacted with each icon 28 of the touch panel display 24, and pushes each icon 28 by use of a sufficient pressure to operate the icon 28. Then, the arm 46 bends, and the contact portion 48 deforms elastically. The pressure of the contact portion 48 in contact with the touch panel display 24 does not exceed a predetermined value. Since the push button and its contact portion of a waterproof case in the past have the same displacement, the contact portion pushes the display surface of the touch panel display downward in accordance with the displacement of the push button even after the contact portion is contacted with an icon. There is strictly a difference in the feel of a finger between the operations of the push button before and after the contact portion is contacted with the icon. It is difficult to feel the difference when imaging is done during underwater swimming. Therefore, when the contact portion pushes the display surface of the touch panel display downward by use of the past push button, the excessive force may be applied to the touch panel display. In contrast, this embodiment is as follows. The contact portion 48 is contacted with the touch panel display 24, and pushes the icons 28 by use of a sufficient pressure to operate the icons 28. After that, even when the push of the push button continues, the arm 46 bends, the contact portion 48 deforms elastically, and the contact portion 48 stops at the initially designed position. Accordingly, the pressure of the contact portion 48 in contact with the touch panel display 24 does not exceed a predetermined value. According to this embodiment, the pressure regulating portion 50 includes the arm 46 and the contact portion 48.

The operation of the waterproof case 30 of this embodiment is explained below.

When the digital still camera 10 is accommodated in the waterproof case 30, the top of the contact portion 48 of each operating member 42 faces each icon 28 of the touch panel display 24 when the operating member 42 is at the protruding position, as shown in FIGS. 7 and 8.

As shown in FIG. 7, the operating portions 44 and bulged portion 41 are disposed outside the touch panel display viewing window 40, the arm 46 is formed of a transparent synthetic resin, and the contact portion 48 is formed of transparent elastomer. When each icon 28 is displayed on the touch panel display 24, the content of each icon 28 is visible through the arm 46 and contact portion 48. As a result, the operability of each operating member 42 is improved advantageously.

When the icons 28 are displayed on the touch panel display 24 or when the icons 28 are not displayed, and when a captured image is displayed on the touch panel display 24, the image which is displayed on the touch panel display 24 is visible through the arm 46 and the contact portion 48. The visibility of the touch panel display 24 is secured advantageously.

By pushing the push button 44A of the operating member 42 corresponding to the desired icon 28A, 28B, or 28C of the operating member 42, the arm 46 is displaced toward the touch panel display 24 via the shaft 44B.

Then, as shown in FIG. 9, the contact portion 48 is contacted with and pushes the icon 28 of the touch panel display 24. The pressure of the contact portion 48 in contact with the touch panel display 24 does not exceed a predetermined value due to the operation of the pressure regulating portion 50.

As a result, the touch panel display 24 detects that the icon 28 is pushed, and the set operation corresponding to the pushed icons 28 is done by the digital still camera 10.

According to this embodiment, each of the multiple operating members 42 which operate the touch panel display 24 includes the operating portion 44, the arm 46, and the contact portion 48. The multiple operating portions 44 and the boss portion (bulged portion 41) which supports these operating portions 44 are able to be arranged outside the profile of the touch panel display 24. Therefore, the display contents of the touch panel display 24 are visible, and since, not like the related art, the surface of the input panel is not deformed, the durability of the operating members 42 is improved advantageously.

The pressure regulating portion 50 regulates the upper limit value of the pressure at which the contact portion 48 is contacted with the touch panel display 24 in response to the push of the operating portion 44 of the operating member 42. The touch panel display 24 is able to be certainly operated by the operating member 42. The pressure regulating portion 50 prevents the excessive force from being applied to the touch panel display 24. The touch panel display 24 is advantageously protected and its durability is advantageously improved while securing the operability of the touch panel display 24.

Therefore, this embodiment is preferable when electronic devices such as the digital still camera 10 having the touch panel display 24 and such as game machines are used underwater, at poolside, outdoors in the rain, etc. The digital still cameras of this kind have enlarged touch panel displays in recent years.

Even when the arm 46 and contact portion 48 are formed of an opaque material and some or all of the icons 28 are invisible due to the arm 46 and contact portion 48, the icons 28 are operable by operating the operating member 42 corresponding to the desired icon 28 because the operating members 42 correspond to the icons 28 respectively. When the arm 46 and contact portion 48 are transparent like in this embodiment, or when at least one of the arm 46 and the contact portion 48 is transparent, the visibility of the icons 28 increases to improve the usability advantageously.

Second Embodiment

A second embodiment is disclosed below.

The second embodiment differs from the first embodiment in the structure of the pressure regulating portion.

Figure 14:
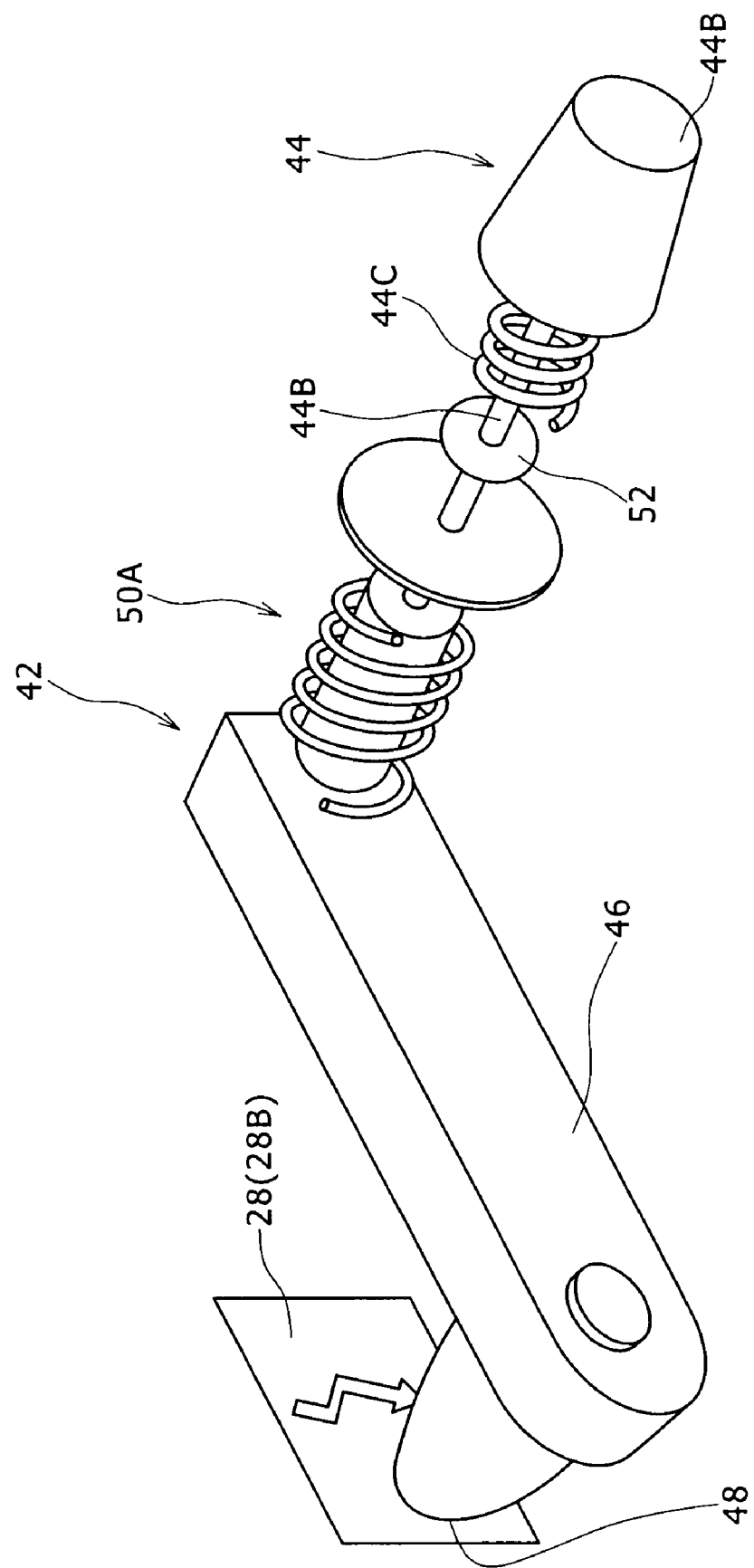
FIG. 14 is a perspective view showing the structure of the operating member 42 in a second embodiment.
Figure 15:
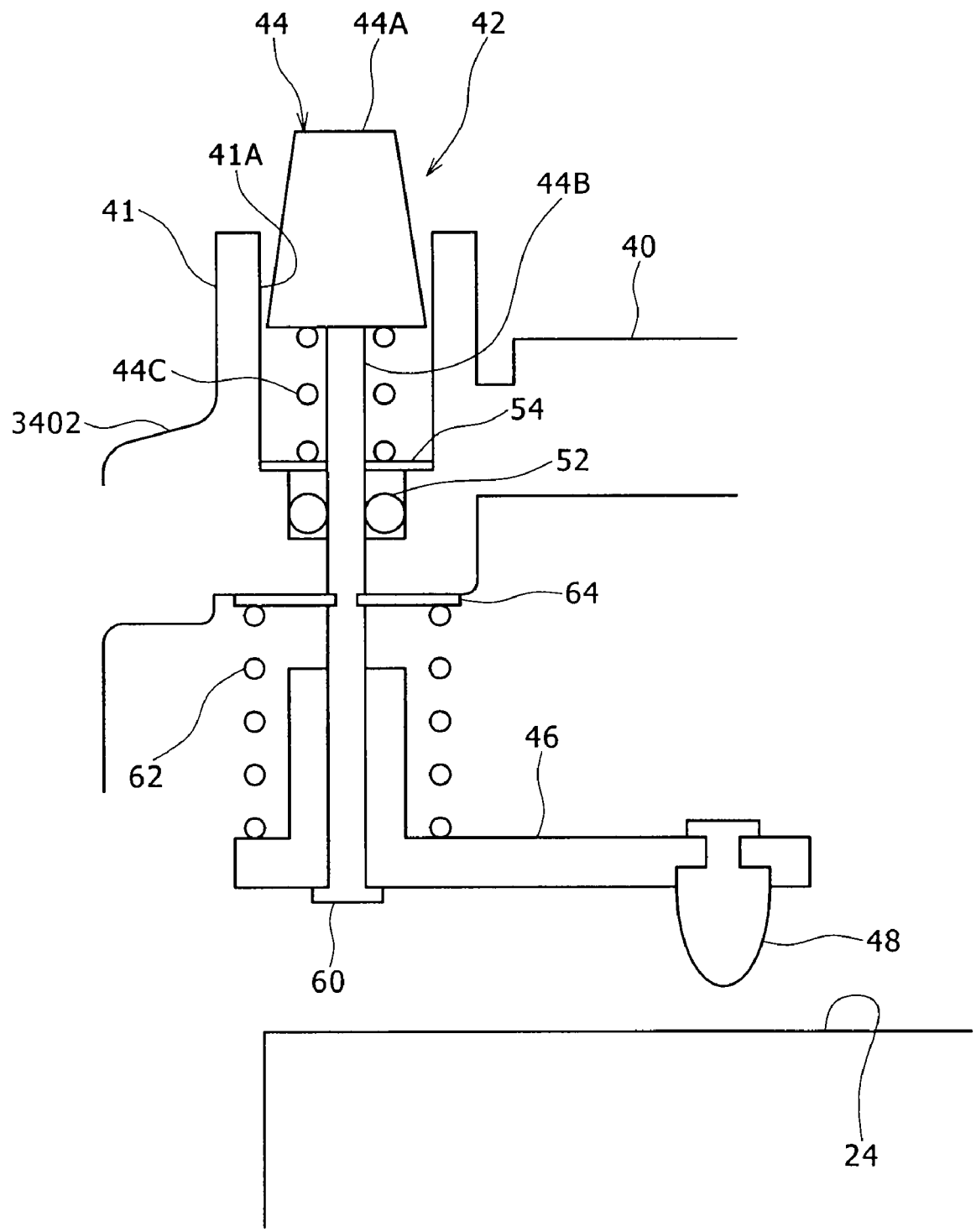
FIG. 15 is a sectional view showing the non-operating state of the operating member 42 in a second embodiment.
Figure 16:
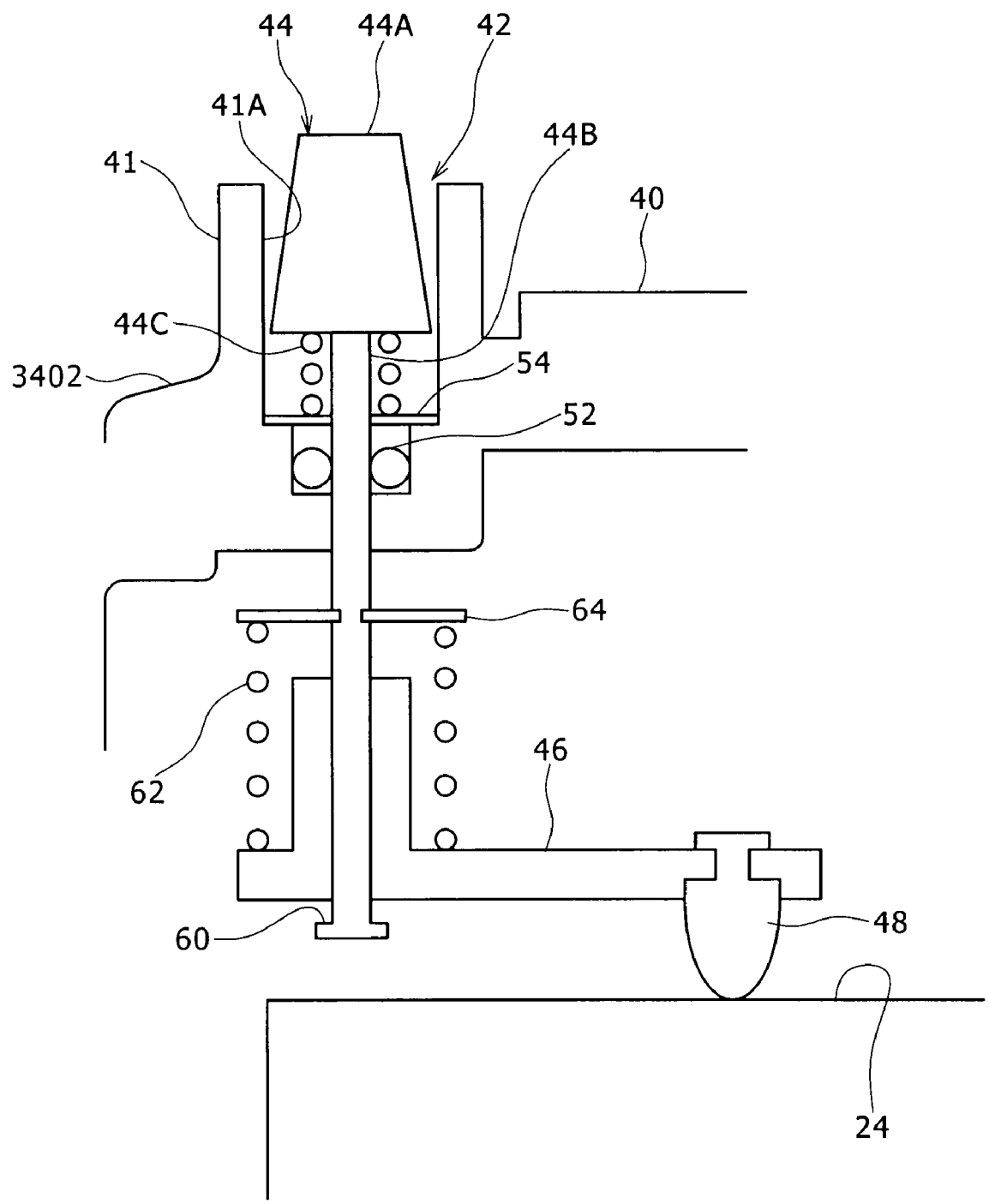
FIG. 16 is a sectional view showing the operating state of the operating member 42.

FIG. 14 is a perspective view showing the structure of the operating member 42 in the second embodiment. FIG. 15 is a sectional view showing the non-operating state of the operating member 42 in the second embodiment. FIG. 16 is a sectional view showing the operating state of the operating member 42. The same portions in the second embodiment as those in the first embodiment are given the same reference numerals as those of the portions in the first embodiment, and not explained.

That is, as shown in FIGS. 14 and 15, the operating member 42 includes the operating portion 44, the arm 46, the contact portion 48, and a pressure regulating portion 50A. The push button 44A is disposed in the concave 41A via the spring 44C for the operating portion, and the shaft 44B penetrates the back wall 3402 via a sealant 52.

The arm 46 is coupled with the shaft 44B to be free to slide in the longitudinal direction of the shaft 44B. A stopper 60 which regulates the inner end limit position of the arm 46 by abutting the arm 46 is formed to the end of the shaft 44B, the end being disposed inwardly from the back wall 3402.

A spring 62 for the arm is formed to the shaft 44B to bias the arm 46 in the direction in which the arm 46 abuts on the stopper 60. The other end of the spring 62 is elastically contacted with a spring bearing 64 attached to the shaft 44B.

According to the second embodiment, as shown in FIG. 15, the protruding position of the operating portion 44 is defined when the spring bearing 64 abuts on the inner surface of the back wall 3402.

As shown in FIG. 16, when the push button 44A is pushed, the arm 46 moves together with the shaft 44B. Then, when the contact portion 48 is contacted with the icon 28 (FIG. 14) of the touch panel display 24, and the push button 44A is pushed further, the spring 62 bends, and only the shaft 44B moves with the arm 46 standing still. Accordingly, the pressure of contact portion 48 in contact with the touch panel display 24 does not exceed a predetermined value. Therefore, the pressure regulating portion 50A includes the arm 46, stopper 60, and the spring 62.

According to the second embodiment, the same advantage as the first embodiment is obtainable.

The arm 46 may be deformed elastically in the direction in which the operating portion 44 is pushed in the second embodiment like in the first embodiment.

Third Embodiment

A third embodiment differs from the first and second embodiments in the shape of the arm 46.

Figure 17A:
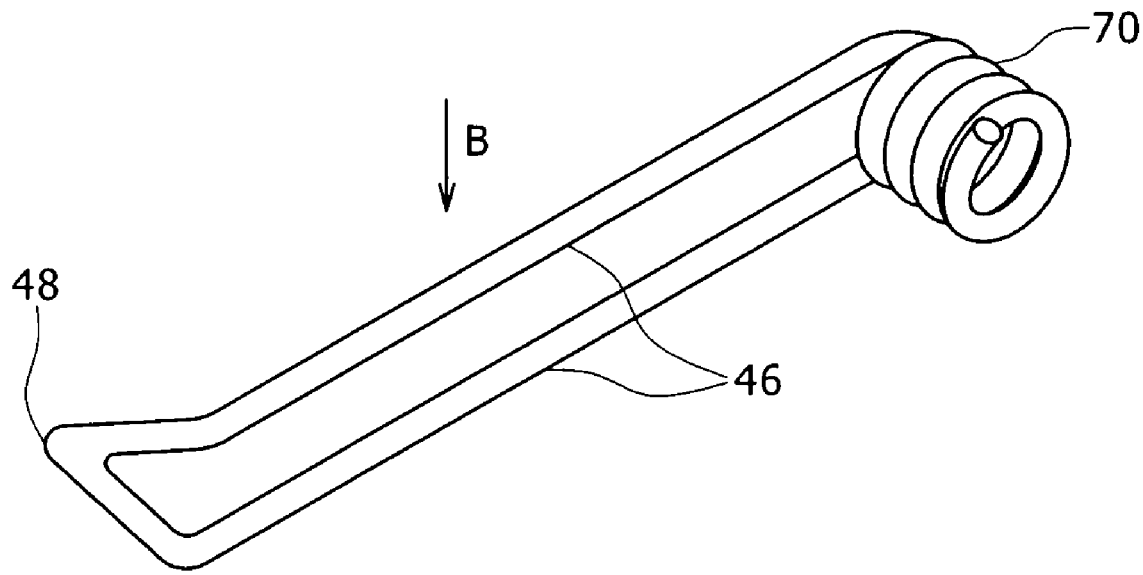
FIG. 17A is a perspective view of the arm 46 and contact portion 48 in a third embodiment.
Figure 17B:
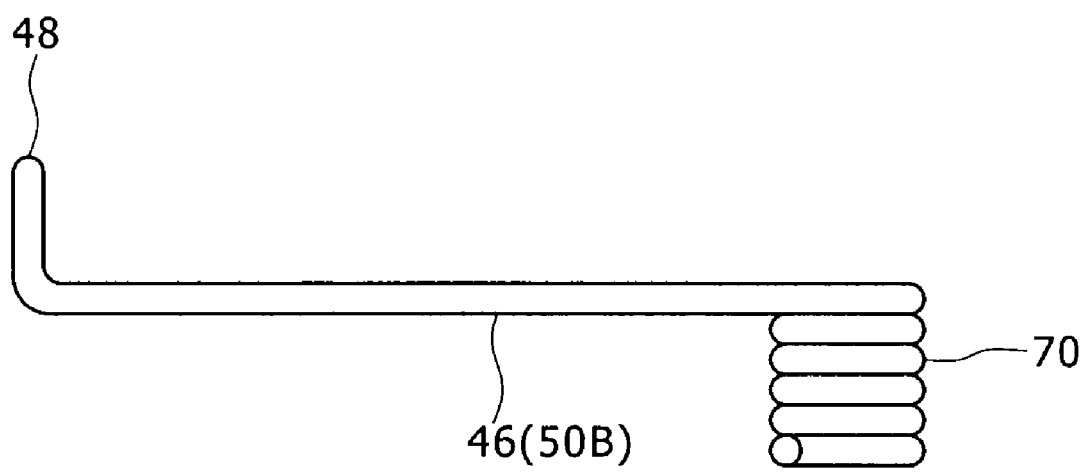
FIG. 17B shows a view from an arrow B of FIG. 17A.

FIG. 17A is a perspective view of the arm 46 and contact portion 48 in the third embodiment. FIG. 17B shows a view from an arrow B.

According to the third embodiment, as shown in FIGS. 17A and 17B, the arm 46 and contact portion 48 are formed integrally by use of a single steel wire rod.

The both longitudinal ends of the wire rod are formed as a coil portion 70 wound into a coiled shape. The coil portion 70 is connected to the end of the shaft 44B (FIG. 8), the end being disposed inwardly from the back wall 3402 (FIG. 8).

The arm 46 extends linearly from the portion of the operating portion 44 with the portions of the wire rod opposing to each other.

The contact portion 48 is formed by bending the tops of the portions of the wire rod and connecting the tops each other, the portions opposing to each other and linearly extending, to cause the top be convex toward the touch panel display 24.

According to the third embodiment, when the arm 46 is displaced toward the touch panel display 24 in response to the push of the operating portion 44, and the contact portion 48 is contacted with the icon 28 of the touch panel display 24, the arm 46 bends. The pressure of the contact portion 48 in contact with the touch panel display 24 does not exceed a predetermined value. Therefore, the pressure regulating portion 50B includes the arm 46.

According to the third embodiment, the same advantage as the first embodiment is obtainable. Additionally, the arm 46 is formed of a pair of the portions of the wire rod. Accordingly, the touch panel display 24 is visible through the arm 46 to improve the operability of the operating member 42 advantageously.

The contact portion 48 (FIG. 8) formed of an elastic material such as rubber and elastomer may be attached to the top of the arm 46 in the third embodiment like in the first embodiment.

The electronic device accommodated in the waterproof case is the digital still camera in the above embodiments. The electronic device is not limited to the digital still camera, but may be any device having a touch panel display and able to be accommodated in the waterproof case. The above embodiments are widely applicable to waterproof cases which accommodates an electronic device such as a video camera, a game machine, a mobile telephone, and a PDA.

It should be understood by those skilled in the art that various modifications, combinations, sub-combinations and alternations may occur depending on design requirements and other factors insofar as they are within the scope of the appended claims or the equivalents thereof.

What is claimed is:

1. A waterproof case for an electronic device having a touch panel display, the waterproof case comprising at least one operating member, the operating member comprising:
   an operating portion which penetrates from an outer surface to an inner surface of a wall forming the waterproof case in a watertight manner and which is disposed to be able to be pushed from an outer surface of the wall;
   an arm extending from a portion of the operating portion, in a direction transverse to a direction in which the operating portion is pushed, the portion being disposed inwardly from the inner surface of the wall;
   a contact portion which is provided to a top of the arm and is arranged to contact the touch panel display in response to a push of the operating portion; and
   a pressure regulating portion which is elastically deformable in a direction in which the operating portion is pushed to establish an upper limit of a pressure applied by the contact portion to the touch panel in response to a push of the operating portion.

2. The waterproof case of claim 1, wherein:
   the pressure regulating portion includes the arm.

3. The waterproof case of claim 1,
wherein: the contact portion is formed of an elastic material; and
the pressure regulating portion includes the contact portion and the arm.

4. The waterproof case of claim 1,
wherein: the operating portion has a push button and a shaft projecting from the push button and penetrating the wall in a watertight manner;
the arm is coupled to the shaft to be free to slide in a longitudinal direction of the shaft;
a stopper which regulates an inner limit position of the arm by abutting the arm is provided to an end of the shaft, the end being disposed inwardly from the wall;
an arm biasing spring which biases the arm in a direction in which the arm abuts on the stopper is provided to the shaft; and
the pressure regulating portion includes the arm, the stopper, and the arm biasing spring.

5. The waterproof case of claim 1,
wherein: the operating portion has an operation-portion biasing spring which biases the operating portion toward a protruding position in which the operating portion is able to be pushed; and
the protruding position is defined when a closer portion of the arm to the operating portion abuts on the wall.

6. The waterproof case of claim 1,
wherein: the operating portion has an operating-portion biasing spring which biases the operating portion toward a protruding position in which the operating portion is able to be pushed;
the protruding position is defined when a closer portion of the arm to the operating portion abuts on the wall; and
a top of the arm and the contact portion are separate from an inner surface of the wall when the operating portion is at the protruding position.

7. The waterproof case of claim 1,
wherein: the waterproof case has a transparent touch panel display viewing window for viewing the touch panel display;
the operating portion is provided to a wall of the waterproof case, the wall being disposed outside the touch panel display viewing window; and
the arm extends from outside to inside the touch panel display viewing window in the waterproof case.

8. The waterproof case of claim 7,
wherein: the touch panel display viewing window has a rectangle shape; and
the arm extends in parallel with one edge of the rectangle shape.

9. The waterproof case of claim 7,
wherein: the touch panel display viewing window has a rectangle shape; and
the arm extends in parallel with an edge of the rectangle shape and in parallel with an inner surface of a wall forming the touch panel display viewing window.

10. The waterproof case of claim 7,
wherein: the touch panel display viewing window has a rectangle shape having left and right edges and upper and lower edges larger than the left and right edges;
the at least one operating member includes a plurality of operating members;
each operating portion of a plurality of the operating members is disposed outside one edge of the left and right edges and arranged in an extending direction of the one edge; and
each arm of a plurality of the operating members extends in parallel with the upper and lower edges.

11. The waterproof case of claim 1 wherein the arm is formed of a transparent synthetic resin.

12. The waterproof case of claim 1 wherein the contact portion is formed of a transparent elastic material.

13. The waterproof case of claim 1 wherein the arm and the contact portion are formed integrally with one another.

14. The waterproof case of claim 1,
wherein: the arm and the contact portion are formed integrally with one another by use of a single steel wire rod;
both longitudinal ends of the wire rod are coupled to a portion of the operating portion, the portion being disposed inwardly from the wall;
the arm is formed by extending portions of the wire rod linearly from the portion of the operating portion while opposing the portions of the wire rod to one another; and
the contact portion is formed by bending a top of the portions of the wire rod, the portions opposing to one another and extending linearly, to cause the top to be convex toward the touch panel display.

15. The waterproof case of claim 1 wherein a rotation prevention mechanism which prevents rotation of the arm around the operating portion is provided to the wall.

16. An electronic device, comprising:
a touch panel display; and
a waterproof case, comprising at least one operating member, the operating member comprising:
an operating portion which penetrates from an outer surface to an inner surface of a wall forming the waterproof case in a watertight manner and which is disposed to be able to be pushed from an outer surface of the wall;
an arm extending from a portion of the operating portion in a direction transverse to a direction in which the operating portion is pushed, the portion being disposed inwardly from the inner surface of the wall;
a contact portion which is provided to a top of the arm and is arranged to contact the touch panel display in response to a push of the operating portion; and
a pressure regulating portion which is elastically deformable in a direction in which the operating portion is pushed to establish an upper limit of a pressure applied by the contact portion to the touch panel in response to a push of the operating portion.

17. A waterproof case for an electronic device having a touch panel display, the waterproof case comprising at least one operating member, the operating member including:
an operating portion which penetrates from an outer surface to an inner surface of a wall forming the waterproof case in a watertight manner and which is disposed to be able to be pushed from an outer surface of the wall;
an arm extending from a portion of the operating portion in a direction transverse to a direction in which the operating portion is pushed, the portion being disposed inwardly from the inner surface of the wall;
means for contacting the touch panel display at a top of the arm in response to a push of the operating portion; and
means for regulating pressure, below an upper limit, applied by the contact portion to the touch panel in response to a push of the operating portion.

* * * * *